(12) United States Patent
Krafft (10) Patent No.: US 7,143,885 B2
(45) Date of Patent: Dec. 5, 2006

(54) ELECTROMAGNETIC FRICTION DISK CLUTCH

(75) Inventor: Rainer Krafft, Heiligenberg (DE)

(73) Assignee: Linnig Trucktec GmbH, Markdorf (DE)

( * ) Notice: Subject to any disclaimer, the term of this patent is extended or adjusted under 35 U.S.C. 154(b) by 127 days.

(21) Appl. No.: 10/987,936

(22) Filed: Nov. 12, 2004

(65) Prior Publication Data

US 2005/0155834 A1    Jul. 21, 2005

(30) Foreign Application Priority Data

Nov. 14, 2003   (DE) ................ 103 53 560

(51) Int. Cl.
*F16D 27/112*    (2006.01)

(52) U.S. Cl. .............. 192/84.94; 192/84.941; 192/84.96; 192/200; 192/111 A (58) Field of Classification Search ............. 192/84.94, 192/84.941, 200
See application file for complete search history.

(56) References Cited

U.S. PATENT DOCUMENTS

| | | | |
|---|---|---|---|
| 2,970,681 A | | 2/1961 | Timmcke |
| 3,007,561 A | * | 11/1961 | Harting .................. 192/84.51 |
| 3,762,516 A | * | 10/1973 | Matsushita ............... 192/84.94 |
| 3,857,468 A | * | 12/1974 | Iritono et al. ............ 192/84.51 |
| 4,296,851 A | * | 10/1981 | Pierce ..................... 192/84.94 |
| 4,564,092 A | | 1/1986 | Pierce |
| 4,821,859 A | * | 4/1989 | Suchdev et al. ....... 192/105 CD |
| 5,036,964 A | | 8/1991 | Booth et al. |
| 5,195,625 A | * | 3/1993 | Chang et al. .......... 192/84.941 |
| 5,909,787 A | * | 6/1999 | Kubo ...................... 192/84.96 |

FOREIGN PATENT DOCUMENTS

| | | | |
|---|---|---|---|
| JP | 56076726 A | * | 6/1981 |
| JP | 58166138 A | * | 10/1983 |

* cited by examiner

*Primary Examiner*—Richard M. Lorence
(74) *Attorney, Agent, or Firm*—Burr & Brown

(57) ABSTRACT

An electromagnetically operable friction disk clutch having a electromagnet as well as having a rotor and an armature element to which the electromagnet can apply a magnetic field for interaction of the rotor and armature element, the armature element being arranged on a resting means which moves the armature element along a rotation axis of the rotor by magnetic force through a movement distance to a stop position on the rotor, and returns elastically without any magnetic forces to a position in which the armature element and the rotor can move, with respect to one another, without touching. According to the invention the resetting means comprise not only an elastic component but also a plastic component which at least partially compensates for the increase in the original movement distance resulting from wear by plastic deformation of the resetting means.

8 Claims, 9 Drawing Sheets

ELECTROMAGNETIC FRICTION DISK CLUTCH

This application claims the benefit of German Application No. 103 53 560.8, filed Nov. 14, 2003, the entirety of which is incorporated herein by reference.

FIELD OF THE INVENTION

The present invention relates to an electromagnetically operable friction disk clutch comprising electromagnet elements, a rotor, a resetting means, comprising at least one elastic component and at least one plastic component that plastically deforms to at least compensate for the increase in movement distance resulting from wear, and an armature, which is positioned along the rotor axis of rotation by a resetting means. Upon the application of power to the electromagnet elements, a magnetic field is applied to the armature moving it across the distance between the rotor and armature to a stop position, in contact with the rotor. When power is removed from the electromagnet elements, the magnetic force is also removed and the armature returns elastically to a position in which the rotor and armature move without touching each other.

BACKGROUND OF THE INVENTION

An electromagnetic friction disk clutch which is known from the prior art comprises, inter alia, a rotor, an electromagnet and an armature disk. When the electromagnet is switched on, a magnetic field is formed, and results in the armature disk being pulled against the rotor. When the electromagnet is switched off, the attraction force thus disappears, the armature disk is disconnected from the rotor by means of a spring element, and is returned to the disengaged clutch position. In the disengaged position, the armature disk is separated from the rotor by an air gap. This air gap must, on the one hand, be as small as possible so that the forces caused by the magnetic field are as large as possible, while, on the other hand, the air gap should be sufficiently large that it prevents the armature disk from inadvertently striking the rotor, for example as a result of axial oscillations occurring, during operation. The friction between the armature disk and the rotor resulting in the armature disk being repeatedly pulled against the rotor results in wear, which leads to an enlarged air gap between the two friction partners in the disengaged state. This results, on the one hand, in the spring force to overcome the air gap rising while, on the other hand, the force acting on the armature disk as a result of the magnetic field decreasing considerably as the air gap becomes larger, so that the torque which can be transmitted falls. In the extreme, this leads to loss of function of the friction disk clutch.

This undesirable effect can be partially compensated for by using a spring with a degressive spring characteristic. Nevertheless, even a spring with a degressive spring characteristic leads to the torque which can be transmitted falling considerably as the air gap becomes ever larger, with the clutch losing its intended functionality.

SUMMARY OF THE INVENTION

The object of the invention is to provide an electromagnetic clutch of the type described in the introduction, which has a comparatively longer life.

This object of the invention is achieved by positioning an armature along the rotor axis of rotation by a resetting means, comprising at least one elastic component and at least one plastic component, which plastically deforms to at least compensate for the increase in movement distance resulting from wear, and moving the armature to the stop position using the electromagnetic force created when power is applied to the electromagnet elements. When power is applied to the electromagnet elements, a magnetic field is created, which moves the armature element across the movement distance between the rotor and armature to a stop position, in contact with the rotor. When power is removed from the electromagnet elements, the magnetic force is also removed and the armature returns elastically to a position in which the rotor and armature move without touching each other.

Additional advantages and expedient developments of the invention are specified in the dependent claims.

The invention is based on an electromagnetically operable friction disk clutch which comprises an electromagnet as well as a rotor and an armature element, to which the electromagnet can apply a magnetic field for interaction of the rotor and armature element, the armature element being arranged on resetting means, by means of which the armature element can be moved along a rotation axis of the rotor by magnetic forces through a movement distance to a stop position on the rotor, and returns elastically without any magnetic forces to a position in which the armature element and the rotor can move with respect to one another without touching. The essence of the invention is now that the resetting means comprise not only an elastic component but also a plastic component which leads, as a result of an increased original movement distance resulting from wear, to plastic deformation of the resetting means, so that it is possible to at least partially compensate for the increase in the movement distance. This results in the relationships for elastic deflection of the resetting means changing only to the extent that the plastic deformation does not completely compensate for the increase in the movement distance. However, this is itself sufficient in order to allow an electrical clutch equipped with such a resetting means to be operated for a considerably longer period without the clutch losing its functionality. This is because the undesirable increase in the movement distance and gap between the armature element and the rotor can be counteracted by the plastic deformation, with the elastic component of the resetting means, as before, ensuring that the armature disk does not strike, that is to say it is pulled back to an adequate extent, when the magnetic field of the electromagnet is switched off.

In one preferred refinement of the invention, the plastic component is designed such that the increase in the movement distance is at least partially compensated for. In consequence, the electromagnetic friction disk clutch has a virtually constant air gap over its entire life.

The resetting means are preferably designed so as to allow compensation for wear amounting to a number of times the original movement distance. Even with an increase in the movement distance and air gap such as this, the plastic compensation does not result in any significant change in the conditions for the elastic component of the resetting means, so that only a relatively minor increase in the deflection forces beyond the basic conditions occurs, which then results in plastic deformation. Thus, overall, the electromagnetic friction disk clutch essentially operates as if the original state still existed even in the event of wear amounting to several times the original movement distance.

Any wear that occurs is preferably compensated for immediately by plastic deformation, so that the spring movement, that is to say the effective movement distance or air gap, and thus the conditions for elastic adjustment of the armature element change only to a minimal extent.

In a further particularly preferred refinement of the invention, the resetting means are geometrically designed such that plastic deformation zones, in which plastic deformation takes place when the original movement distance increases as a result of wear. Particularly, if the resetting means are in the form of a flat spring with curved spring arms, areas with plastic deformation characteristics will, up to a certain extent, also have elastic characteristics, while areas which essentially have only elastic characteristics are preferably formed by appropriate shaping of the spring arms.

Apart from this, it is particularly advantageous for the resetting means to comprise at least one component with predominantly elastic characteristics, and at least one component with plastic characteristics, which deforms plastically in the event of an increase in the original movement distance as a result of wear. These components are preferably arranged connected in series. It is thus possible to predetermine and set the elastic characteristics and the plastic characteristics in a simple manner, independently of one another. A design of the resetting means such as this can be designed comparatively more easily, as a result of the decoupled structures.

By way of example, the plastic component of the resetting means comprises an inclined annular sheet-metal element. Arms are preferably cut out of the annular section of the sheet-metal element, which deform plastically when, for example, the deflection of an elastic component resulting from wear is greater than the original displacement movement. A rubber element, for example a rubber ring, may be used, for example, as the elastic component of the resetting means. The rubber ring is preferably located between a flanged disk and the plastic component, for example the inclined annular sheet-metal element, on which the armature element is then mounted.

The predominantly elastic element, for example the rubber element, is preferably designed such that it allows not only elastic resetting characteristics but also torsional damping.

The interaction between a plastic component and an elastic component can also be regarded as plastic deformation, which occurs when the deflection forces of the elastic component exceed a predetermined order of magnitude, as is the case when the elastic component is forced by wear to deform elastically to a greater extent than with the original movement distance, which was not subject to wear.

BRIEF DESCRIPTION OF THE DRAWINGS

More detailed exemplary embodiments of the invention are illustrated in the drawings and will be explained in more detail in the following text, indicating further advantages and details. In the figures.

DETAILED DESCRIPTION OF THE INVENTION

Figure 1:
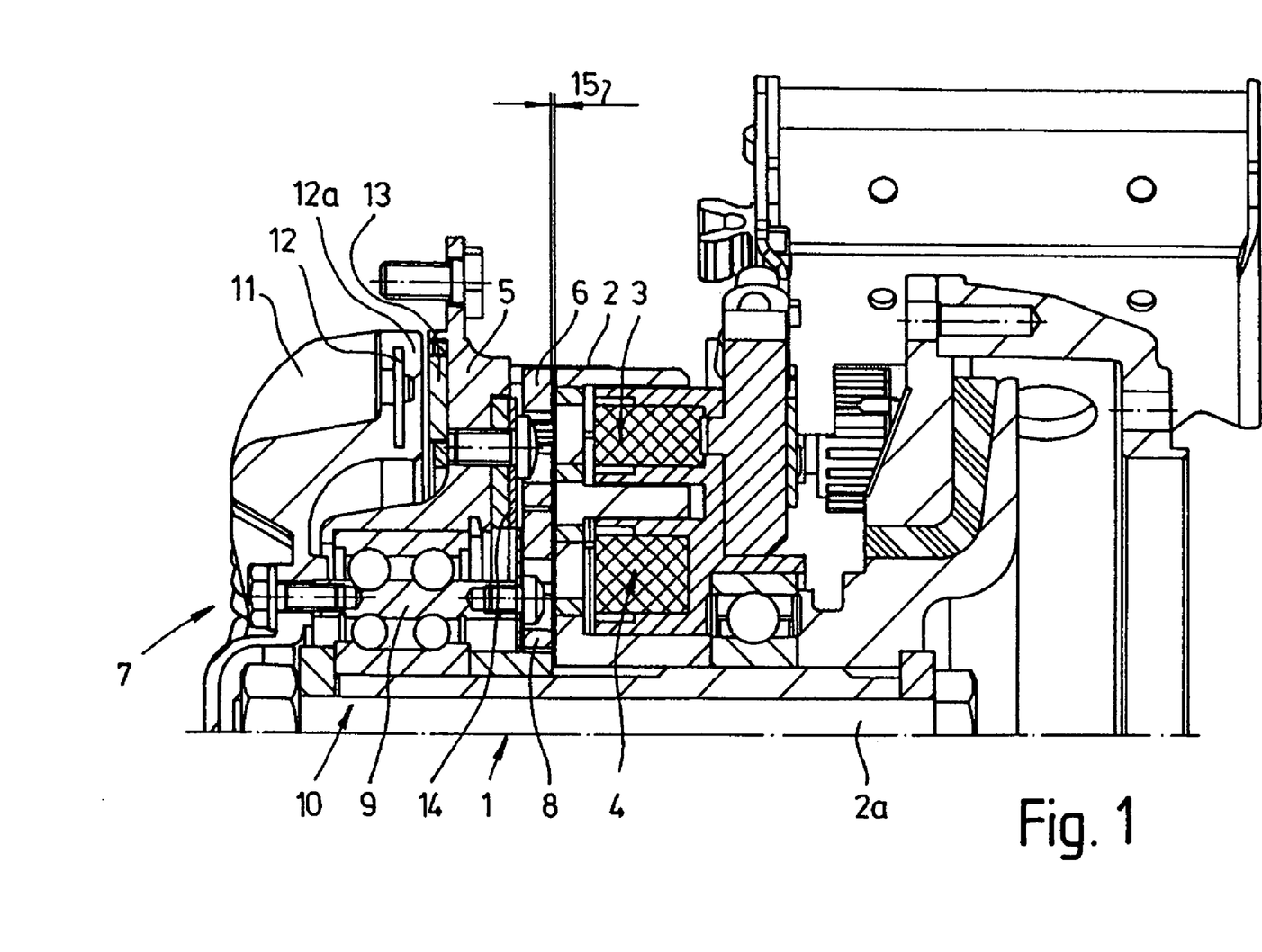
FIG. 1 shows a two-stage friction disk clutch in a partially sectioned side view.

FIG. 1 shows a two-stage friction disk clutch 1. The electromagnetic clutch 1 has a rotor 2 which, for example, is driven via a drive shaft 2a, as well as electromagnets 3, 4, a rotating flange 5 which is caused to rotate, for example, a fan impeller with an armature disk 6, and an eddy current clutch 7.

The eddy current clutch 7 acts in a first stage of the two-stage clutch, in which current flows through the electromagnet 4, so that the armature disk 8 is drawn against the rotor 2, thus resulting in a center ring 9 of a two-stage ball bearing 10 rotating with the rotor 2. A rotating element 11 with a cast-in steel disk 12 is mounted on this center ring 9 and thus rotates with the center ring 9. Eddy currents are produced in an eddy current area 12a by means of opposite permanent magnets 13 which are arranged on the rotating flange 5, forming a magnetic field which counteracts the rotational force, so that the rotating flange 5 rotates at a slower speed of rotation than the rotating element 11 due to the eddy current clutch 7.

The second stage of the friction disk clutch acts when current is flowing through the electromagnet 3. In this case, the armature disk 6, which is connected to the rotating flange 5 via an elastic/plastic resetting element 14, is drawn against the rotor 2, so that the rotating flange 5 rotates at the same speed as the rotor when the armature disk 6 is not in contact with the rotor 2.

The first stage of the clutch can also be equipped with an elastic/plastic resetting element, so that the following statements also apply.

When the electromagnet 3 is switched off, that is to say its magnetic force is set to zero, the armature disk 6 is disconnected from the rotor 2 by the resetting element 14, and is returned to a reset position. In the reset position, when the electromagnet 3 is not switched on, the armature disk 6 is separated from the rotor 2 by an air gap 15. This air gap must be of such a size that the electromagnet 3 can transmit its "magnetic force" as effectively as possible to the armature disks 6, which leads to an air gap which is as small as possible, while also ensuring that the armature disk 6 does not unintentionally strike the rotor 2 as a result, for example, of axial oscillations occurring during operation, when the electromagnet is switched off. A larger air gap would have to be provided to satisfy this requirement. Repeated engagement of the armature disk 6 and the rotor 2, results in wear which enlarges the air gap 15 between the friction partners when the electromagnet 3 is not switched on.

Figure 2:
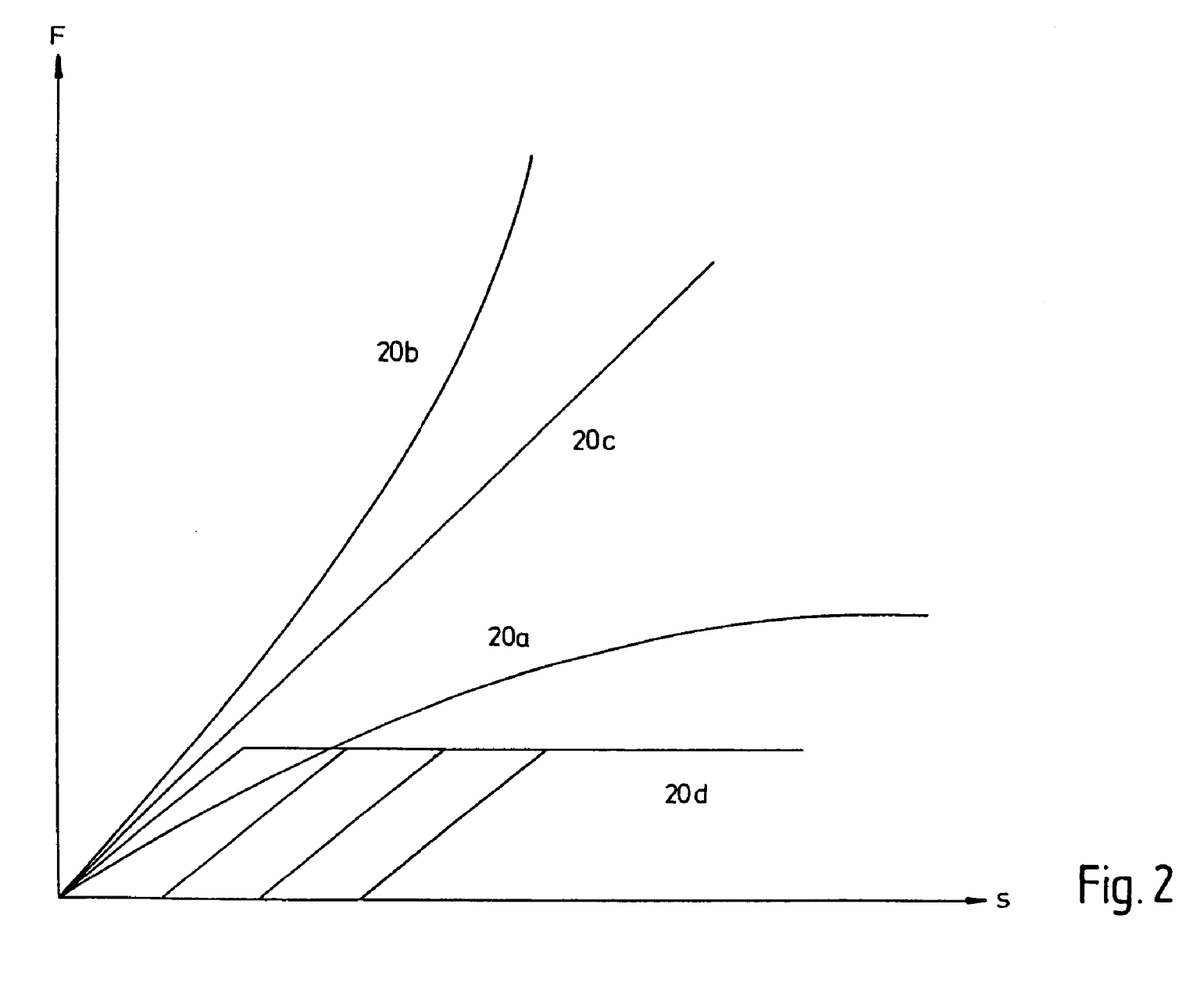
FIG. 2 shows the characteristic of the spring force F plotted against the deflection movement s of various spring elements.

An increase in the air gap leads to the deflection force required for a conventional resetting element becoming ever greater while the influence of the magnetic field on the armature becomes ever weaker. This undesirable effect can be partially compensated for by, for example, using a spring with a degressive characteristic 20a as illustrated in FIG. 2. Nevertheless, this characteristic means that, as the wear increases, resulting in the air gap 15 becoming larger, the torque which can be transmitted falls to such an extent that the friction disk clutch 1 ceases to operate reliably.

In addition to the characteristic 20a for a spring with a degressive characteristic, FIG. 2 shows a progressive characteristic 20b, a linear characteristic 20c and a characteristic 20d for a spring with elastic/plastic characteristics. However, the springs 20a, 20c cannot adequately solve the wear problem. In contrast, the wear problem can be solved by an elastic/plastic spring element on the resetting element 14.

Figure 3:
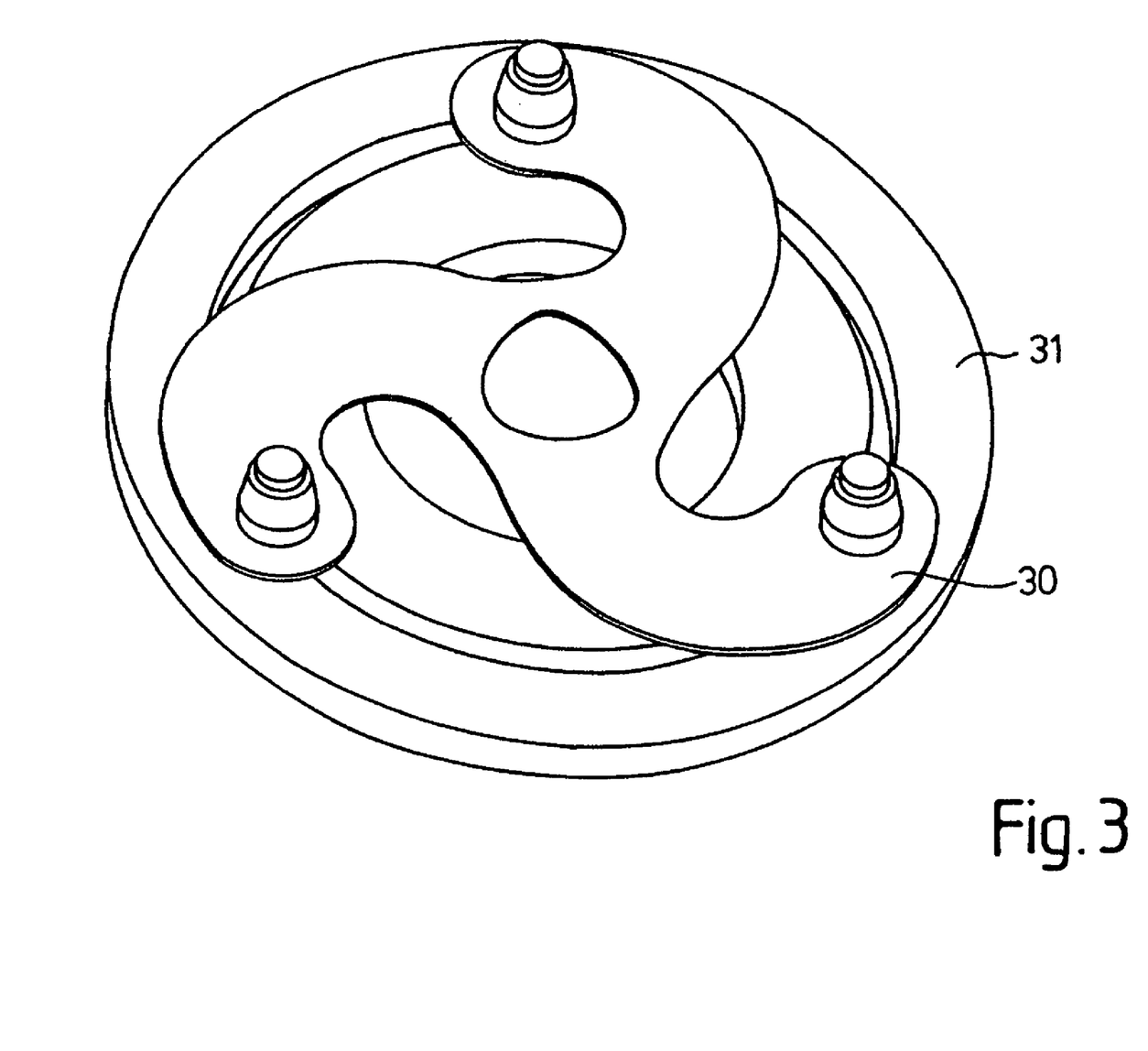
FIG. 3 shows an elastic/plastic resetting element with an armature disk, illustrated in perspective.

FIG. 3 shows an elastic/plastic resetting element 30 mounted on an armature disk 31. This elastic/plastic resetting element 30 allows the wear problem to be solved by the fact that the elastic/plastic resetting element always deforms plastically by the amount of change of the air gap as it becomes larger, so that the elastic components can be used in a state which corresponds essentially to the initial state.

Figure 4:
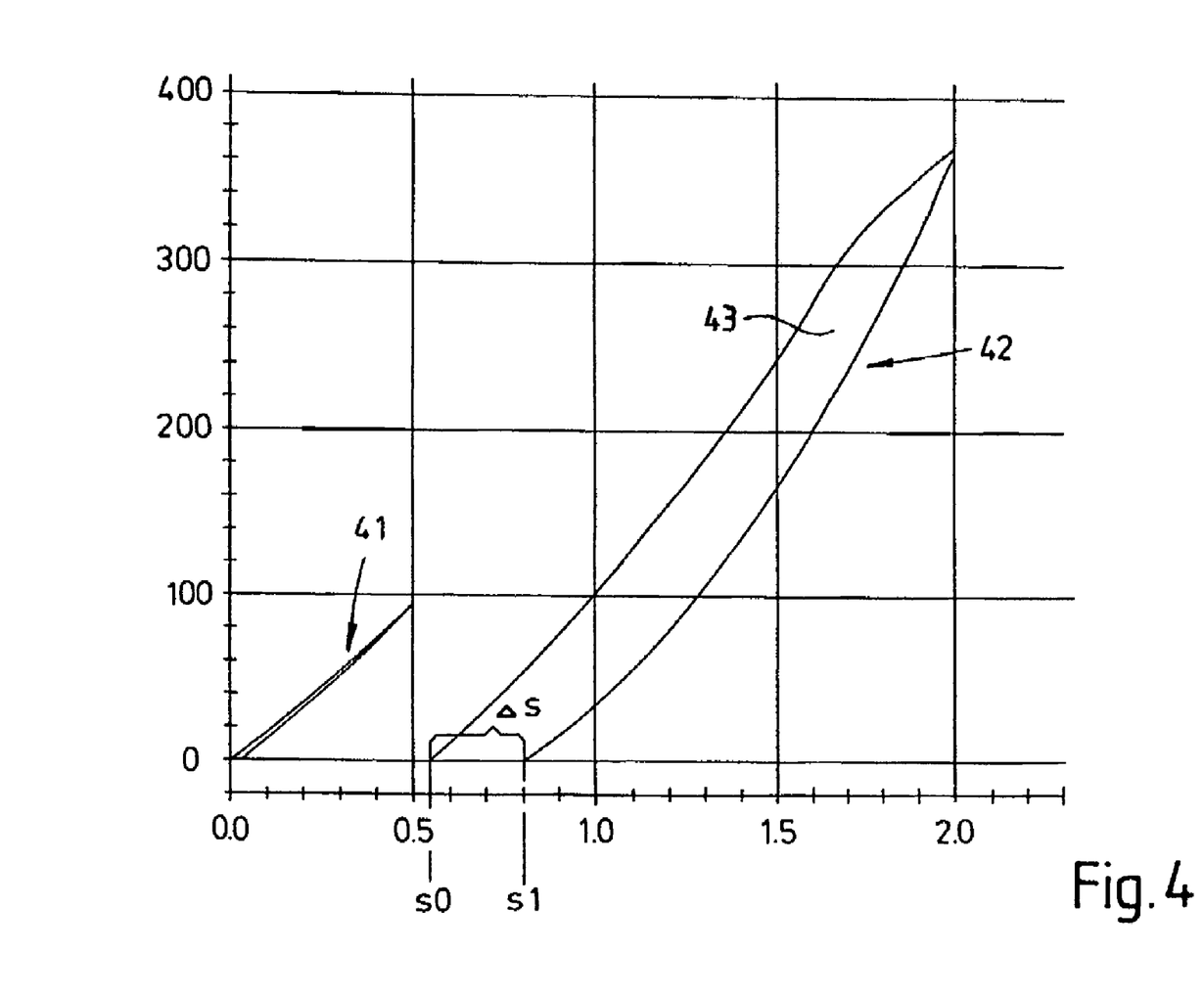
FIG. 4 shows the characteristic of the force against the movement of an elastic resetting element, and of an elastic/plastic resetting element.

FIG. 4 shows the characteristic 41 of an elastic spring and the characteristic 42 of an elastic/plastic resetting element. As can clearly be seen, the two characteristics differ in that the characteristic 41 has no hysteresis, while the characteristic 42 for the elastic/plastic resetting element has a hysteresis 43. This means that, once the resetting element has been deflected by a distance $s_x$ from an initial position $s_0$, the so $s_0$ resetting element no longer returns to the initial point $s_0$ but, as a result of the plastic deformation, returns back to a reset position $s_1$, which differs from the initial position $s_0$ by an additional distance $\Delta s$.

This characteristic of an elastic/plastic resetting element 30 can now be used to continuously compensate, by plastic deformation of the resetting element 30, for increases in the deflection of the resetting element 30 that occur as a result of wear as the air gap 15 becomes larger.

Figure 5A:
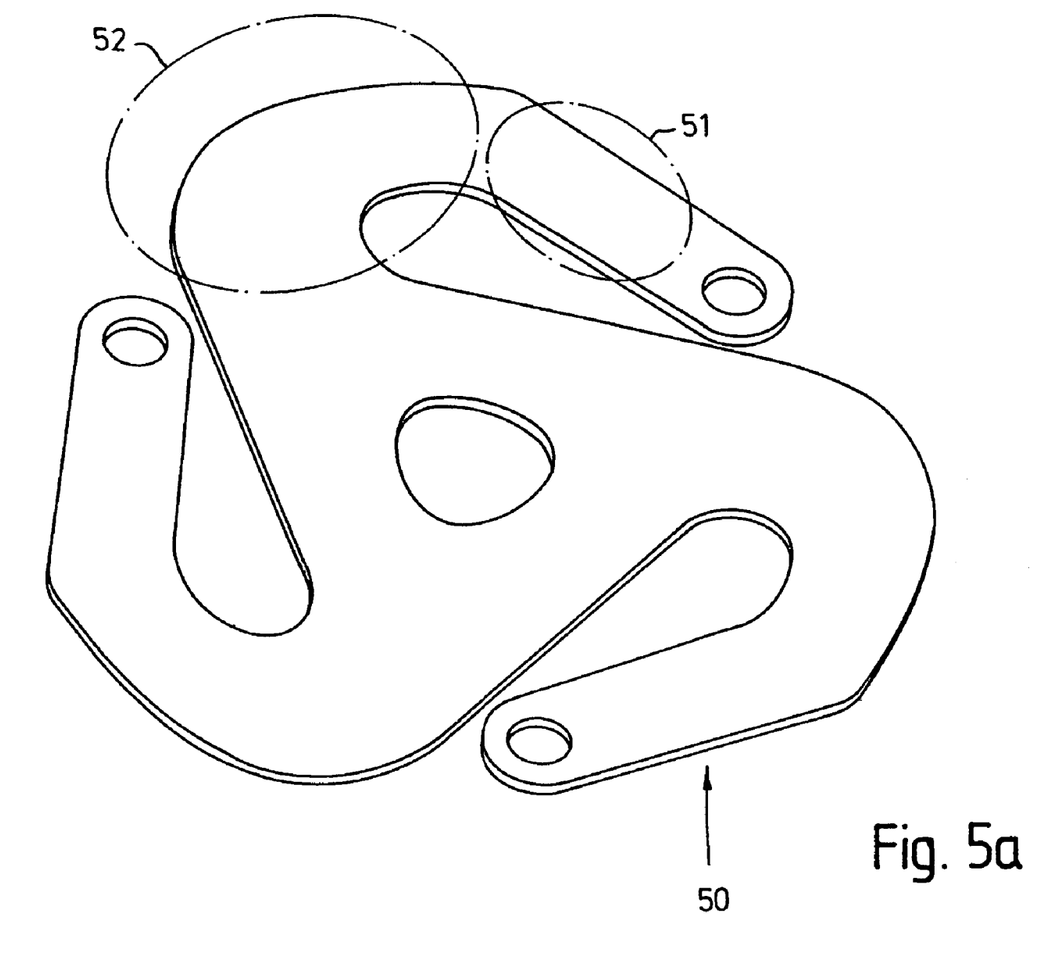
FIG. 5a shows an elastic/plastic resetting element in the form of a flat spring, illustrated in perspective.
Figure 5B:
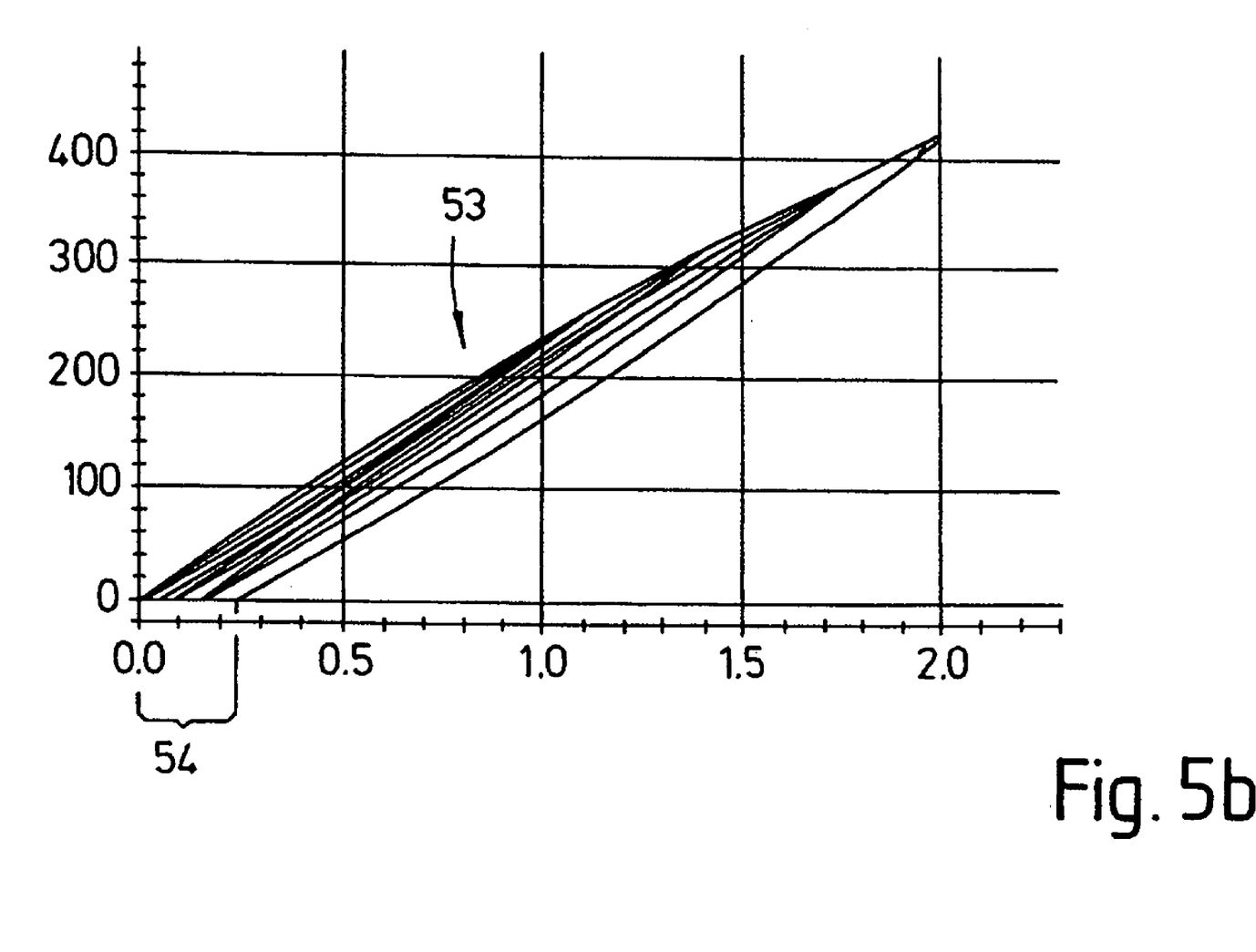
FIG. 5b shows an associated characteristic of the force plotted against the movement.

FIG. 5a shows another elastic/plastic resetting element 50, which has zones 51 with predominantly elastic characteristics, as well as zones 52 with elastic/plastic characteristics. This results in a characteristic 53, from which it can be seen that the reset point of the resetting element moves to the right along the X axis (movement axis) in the graph due to the plastic deformation 54, but only when a deflection force is exceeded by a larger air gap 15.

In the present example, the resetting element 50 is in the form of a 3-armed flat spring element, in which the arms run on a bend. The bend area 52 is designed such that it has elastic/plastic characteristics.

Figure 6A:
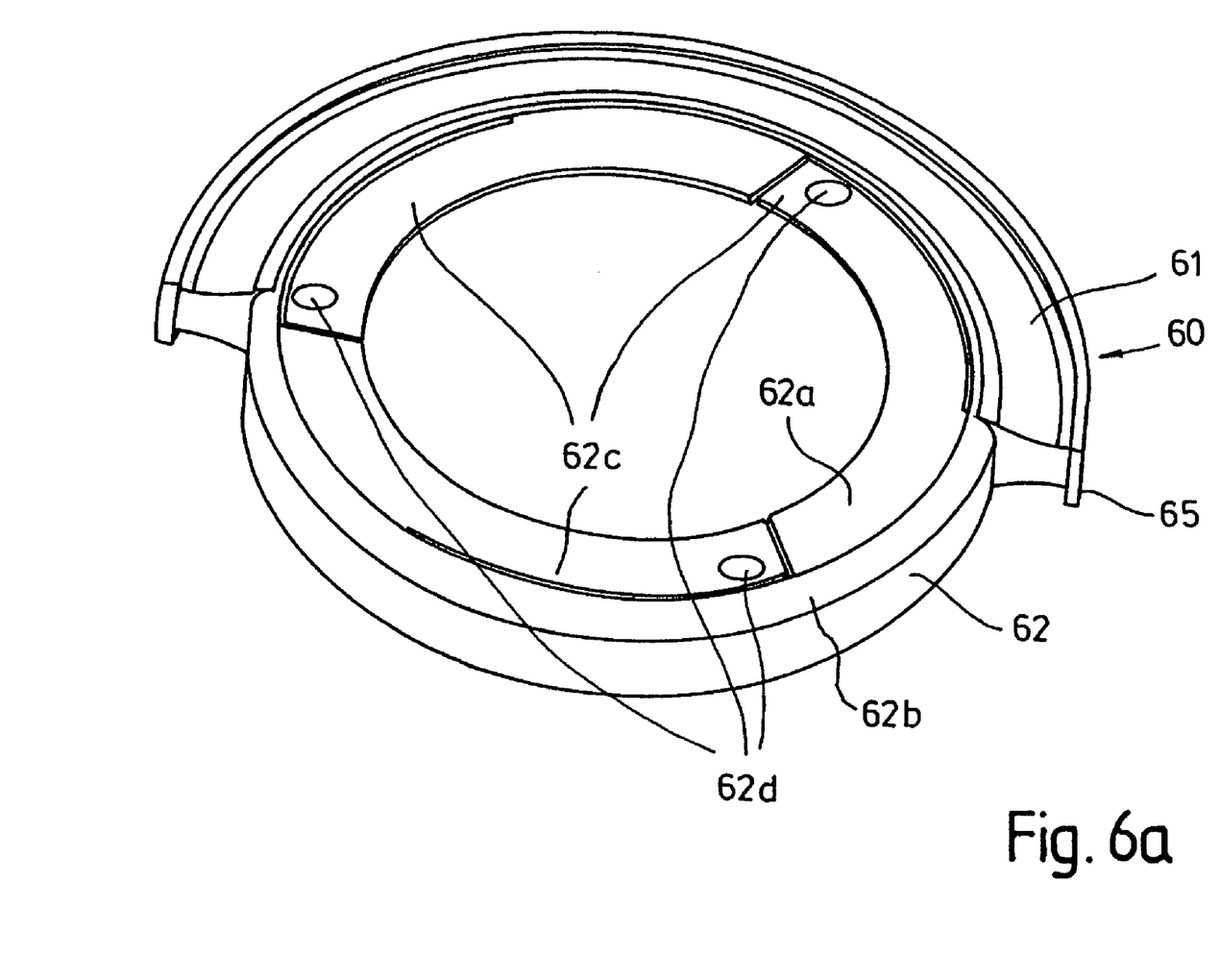
FIG. 6a shows the partially sectioned perspective view of an elastic/plastic resetting element, which has a component with predominantly elastic characteristics and a component which allows plastic deformation.
Figure 6B:
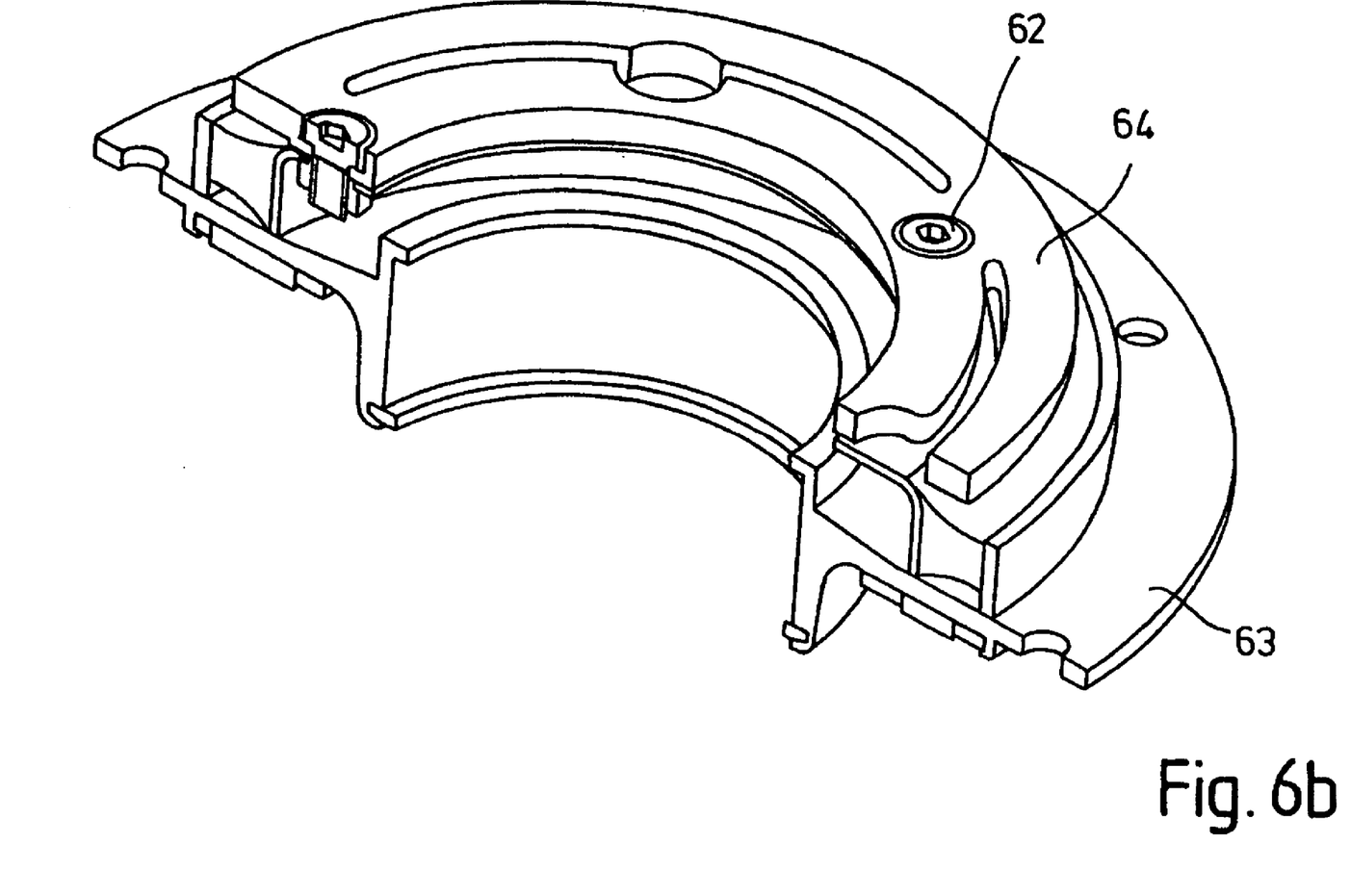
FIG. 6b shows a sectioned perspective view of the resetting element shown in FIG. 6a between an armature element and a flanged part, for example, a fan impeller.

The elastic/plastic characteristics of an overall resetting element can also be achieved by combining a component 61 with predominantly elastic characteristics in the form of a rubber ring with a component 62 with elastic/plastic characteristics, connected in series, as in the resetting element 60 shown in FIGS. 6a and 6b. At the same time as acting as the elastic resetting element, the rubber ring 61 carries out a torsional damping function. FIG. 6b illustrates the arrangement of the resetting element 60 between a rotating flange 63, for example, of a fan impeller, and an armature disk 64. The armature disk 64 is firmly connected to the component 62, and the rubber ring 61 is firmly connected via a holding ring 65 to the rotating flange 63.

The elastic/plastic component 62 is in the form of an annular sheet-metal element with an annular area 62a and an inclined area 62b.

Arms 62c which follow the circular ring and have the desired elastic/plastic characteristics are cut out in the annular area 62a. Screws 62e (see FIG. 6b) or other connecting elements are inserted via holes 62d at the front end of the arms 62c, to arrange the armature disk 64.

Figure 6C:
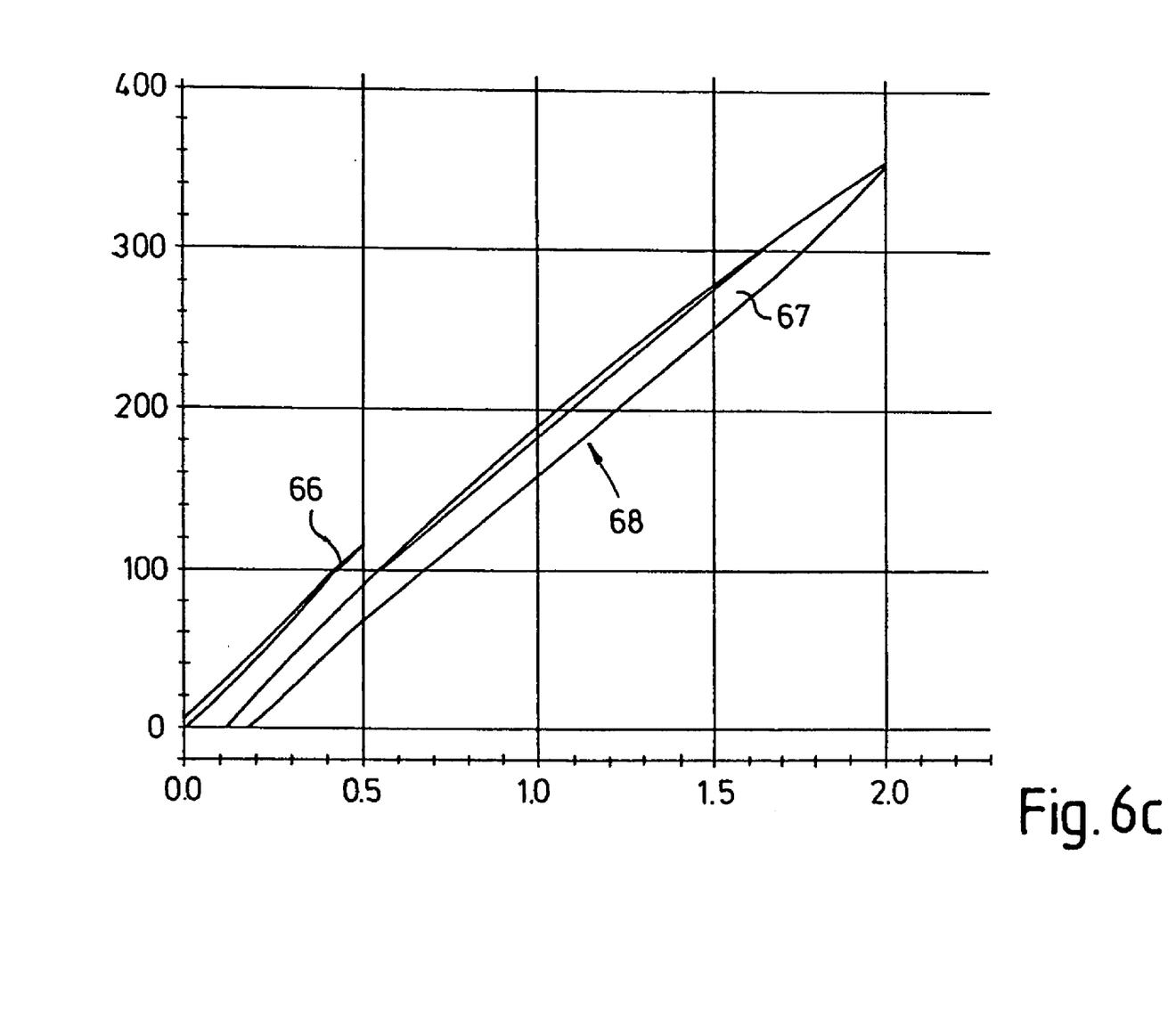
FIG. 6c shows the characteristic of the force plotted against the movement of the component with predominantly elastic characteristics as well as the component with elastic/plastic characteristics of the resetting element shown in FIGS. 6a and 6b.

FIG. 6c shows the characteristic of the individual components 62 and 63 of the resetting element 60. The rubber element 61 has an elastic characteristic 66, predominantly without any hysteresis, while, in contrast, the inclined sheet-metal ring part 62 has elastic/plastic characteristics, with the characteristic 68 having corresponding hysteresis 67.

By way of example, the air gap between the armature disk 6, 31, 64 is originally 0.3 to 0.5 mm. Normally, when the size of the air gap 15 has increased to between 1 and 1.2 mm as a result of wear, the functionality of the corresponding friction disk clutch is no longer adequate.

The principle according to the invention allows simple compensation for additional wear from 1 to 1.5 mm, while maintaining an original air gap of, for example, 0.3 to 0.5 mm. This results in friction disk clutches, which are equipped with resetting elements 14, 30, 50, 60 according to the invention, having a considerably longer life.

While the present invention has been particularly shown and described with reference to the preferred mode as illustrated in the drawings, it will be understood by one skilled in the art that various changes in detail may be effected therein without departing from the spirit and scope of the invention as defined by the claims.

| List of reference symbols: | |
|---|---|
| 1 | Friction disk clutch |
| 2 | Rotor |
| 2a | Drive shaft |
| 3 | Electromagnet |
| 4 | Electromagnet |
| 5 | Rotating flange |
| 6 | Armature disk |
| 7 | Eddy current clutch |
| 8 | Armature disk |
| 9 | Center ring |
| 10 | Two-stage bearing |
| 11 | Rotating element |
| 12 | Steel disk |
| 12a | Eddy current area |
| 13 | Permanent magnet |
| 14 | Resetting element |
| 15 | Air gap |
| 20a | Characteristic |
| 20b | Characteristic |
| 20c | Characteristic |
| 20d | Characteristic |
| 30 | Elastic/plastic resetting element |
| 31 | Armature disk |
| 41 | Characteristic |
| 42 | Characteristic |
| 43 | Hysteresis |
| 50 | Elastic/plastic resetting element |
| 51 | Zone |
| 52 | Zone |
| 53 | Characteristic |
| 60 | Resetting element |
| 61 | Component |
| 62 | Component |
| 62a | Annular area |
| 62b | Inclined area |
| 62c | Arm |
| 62d | Hole |
| 62e | Screw |
| 63 | Rotating flange |
| 64 | Armature disk |
| 65 | Holding ring |
| 66 | Characteristic |
| 67 | Hysteresis |
| 68 | Characteristic |

The invention claimed is:

1. An electromagnetically operable friction disk clutch having an electromagnet, a rotor and an armature element, to which the electromagnet applies a magnetic field for interaction of the rotor and armature element, the armature element being arranged on resetting means, by means of which the armature element moves along a rotation axis of the rotor by magnetic forces through a movement distance to a stop position on the rotor, and returns elastically without any magnetic forces to a position in which the armature element and the rotor move with respect to one another without touching, wherein the resetting means comprises an elastic component and a plastic component which leads, as a result of an increase in the movement distance resulting from wear, to plastic deformation of the resetting means thereby at least partially compensating for the increase in the movement distance.

2. The clutch of claim 1, wherein the plastic component is designed such that the increase in the movement distance is approximately compensated for.

3. The clutch of claim 1, wherein the resetting means is geometrically designed such that plastic deformation zones result, in which plastic deformation takes place in the event of an increase in the movement distance as result of wear.

4. The clutch of claim 1, wherein the resetting means is in the form of a flat spring with curved arms.

5. The clutch of claim 1, wherein the resetting means has at least one component with predominantly elastic characteristics, and at least one component with predominantly plastic characteristics, which deforms plastically in the event of an increase in the movement distance as a result of wear.

6. The clutch of claim 1, wherein the resetting means has an inclined, annular sheet-metal element.

7. The clutch of claim 1, wherein the resetting means has a rubber element.

8. The clutch of claim 1, wherein the resetting means has predominantly elastic characteristics and torsion damper characteristics at the same time.

* * * * *